(12) United States Patent
Parker

(10) Patent No.: US 12,741,713 B2
(45) Date of Patent: Sep. 22, 2026

(54) MODULAR ADJUSTABLE FRONT WHEEL DRIVE BICYCLE FRAME

(71) Applicant: James E.S. Parker, Newbury, MA (US)

(72) Inventor: James E.S. Parker, Newbury, MA (US)

( * ) Notice: Subject to any disclaimer, the term of this patent is extended or adjusted under 35 U.S.C. 154(b) by 332 days.

(21) Appl. No.: 18/429,716

(22) Filed: Feb. 1, 2024

(65) Prior Publication Data

US 2024/0336322 A1 Oct. 10, 2024

Related U.S. Application Data

(60) Provisional application No. 63/456,840, filed on Apr. 4, 2023.

(51) Int. Cl.

| | |
|---|---|
| ***B62K 3/00*** | (2006.01) |
| ***B62K 3/02*** | (2006.01) |
| ***B62K 15/00*** | (2006.01) |
| ***B62K 19/18*** | (2006.01) |
| ***B62K 21/18*** | (2006.01) |

(52) U.S. Cl.
CPC ................ *B62K 3/005* (2013.01); *B62K 3/02* (2013.01); *B62K 19/18* (2013.01); *B62K 2015/001* (2013.01); *B62K 21/18* (2013.01)

(58) Field of Classification Search
CPC .......... B62K 3/005; B62K 3/02; B62K 21/18; B62K 19/18; B62K 2015/001
See application file for complete search history.

(56) References Cited

U.S. PATENT DOCUMENTS

| | | | | |
|---|---|---|---|---|
| 4,548,421 | A * | 10/1985 | Wiener | B62K 3/005 280/282 |
| 4,647,060 | A * | 3/1987 | Tomkinson | B62K 3/005 280/288.1 |
| 4,778,192 | A * | 10/1988 | McElfresh | B62K 3/10 280/270 |
| 5,419,574 | A * | 5/1995 | Krumm | B62K 3/005 280/288.4 |
| 5,584,494 | A * | 12/1996 | Krumm | B62K 15/00 280/288.1 |
| 5,607,171 | A * | 3/1997 | Labranche | B62K 21/18 280/270 |
| 5,620,196 | A * | 4/1997 | Belik | B62K 3/005 280/281.1 |
| 6,497,426 | B2 * | 12/2002 | VanPelt | B62K 13/02 280/288.1 |

(Continued)

FOREIGN PATENT DOCUMENTS

| | | | | |
|---|---|---|---|---|
| DE | 10054273 | A1 * | 5/2002 | B62K 3/005 |
| WO | WO-2014083481 | A1 * | 6/2014 | B62K 15/006 |

*Primary Examiner* — Timothy Wilhelm
(74) *Attorney, Agent, or Firm* — Leyendecker S Lemire

(57) ABSTRACT

A front wheel drive recumbent bicycle frame and bicycle are described wherein the wheelbase is adjustable between a fully extended position and a fully retracted position by adjusting the length of a telescoping main tube. The main tube of the bicycle frame rises as it extends rearwardly relative to both a flat underlying surface and a line drawn from the front dropouts to rear dropouts. Accordingly, the adjustment of the wheelbase also changes several important bicycle parameters including the head tube angle, trail, and backrest angle.

17 Claims, 5 Drawing Sheets

(56) References Cited

U.S. PATENT DOCUMENTS

| | | | | |
|---|---|---|---|---|
| 6,565,106 | B2 * | 5/2003 | Lopez | B62K 27/00 280/203 |
| 7,753,388 | B2 * | 7/2010 | Tolhurst | B62K 3/005 280/288.1 |
| 7,976,046 | B2 * | 7/2011 | Rathsack | B62K 5/10 280/282 |
| 8,210,555 | B2 * | 7/2012 | Belenkov | B62K 3/005 280/282 |
| 8,342,555 | B2 * | 1/2013 | Ball | B62K 15/00 280/282 |
| 9,359,034 | B2 * | 6/2016 | Rasmussen | B62M 6/40 |
| 9,656,714 | B2 * | 5/2017 | Vulk, Jr. | B62K 3/14 |
| 10,513,304 | B2 * | 12/2019 | Thomson | B62M 1/36 |
| 11,292,549 | B2 * | 4/2022 | Wawrzynski | B62K 19/18 |
| 2006/0273543 | A1 * | 12/2006 | Jong | B62K 13/08 280/281.1 |
| 2008/0116665 | A1 * | 5/2008 | Nakaizumi | B62K 15/00 280/638 |

* cited by examiner

MODULAR ADJUSTABLE FRONT WHEEL DRIVE BICYCLE FRAME

RELATED REFERENCES

This application claims priority to and fully incorporates by reference U.S. provisional patent application No. 63/456,840 filed on Apr. 4, 2022 that has both the same title and inventor as the present application.

BACKGROUND

Recumbent bicycles tend to be very long and have a long wheelbase especially when compared to a typical upright bicycle. This makes transporting and shipping them more difficult often requiring very large oversize boxes, This not only increases the cost of shipping a bike from the manufacturer to either a retailer or a purchaser, but also makes it more expensive for a cyclist to travel to cycling events across the country. If the cyclist is driving to an event, it may be difficult to fit the bicycle, even if the wheels are removed, in many vehicles. If the cyclist is flying, the oversize luggage cost may be substantial if not prohibitive.

Further, on a typical recumbent frame as well as most bicycle frames, parameters, such as the wheelbase, trail, and head tube angle, are fixed. A cyclist who desires a quick handling bike for certain situations, such as racing, or a more stable bike, such as for touring, typically has to purchase separate frames with the desired combination of these parameters, and in most instances for the sake of convenience build each up into a separate bicycle, If the cyclist is traveling to an event in which he/she desires to have bikes with both sets of handling characteristics, he/she must transport both.

While bicycles with folding or uncoupling frames are known that can solve the transportation length issue, folding or coupling joints are known to present weak points on the frame and may induce undesirable flex into the frame at the connection points. However, these frames do not allow for the bicycle's parameters, such as wheelbase and head tube angle to be adjusted.

DETAILED DESCRIPTION

Overview

Figure 1:
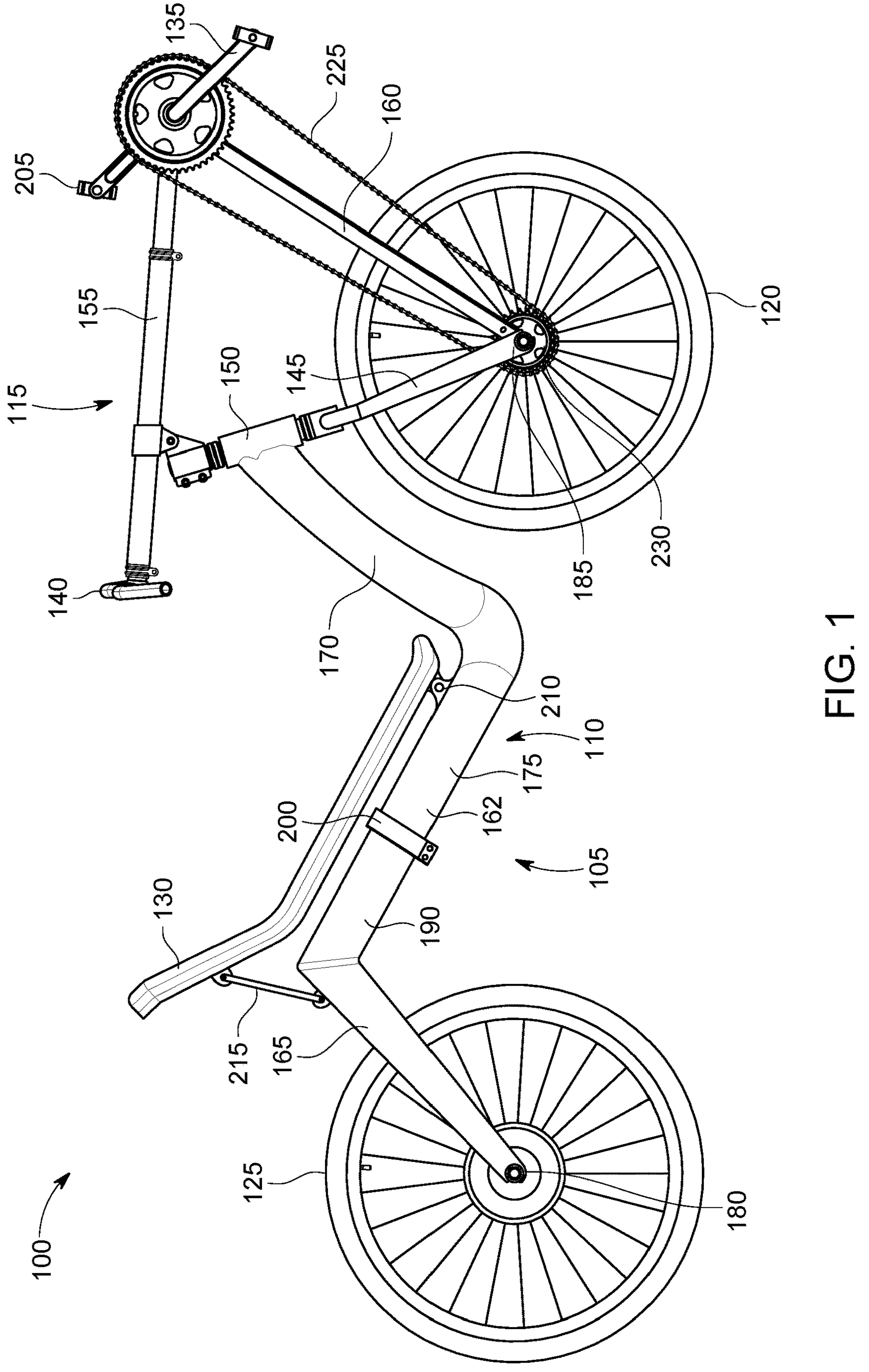
FIG. 1 is two-dimensional side view of a front wheel drive recumbent bicycle according to one embodiment of the present invention.

Embodiments of the present invention comprise a front wheel drive recumbent bicycle frame wherein the wheelbase is adjustable between a fully extended position and a fully retracted position by adjusting the length of a telescoping main tube assembly. Importantly, when built into a bicycle, the main tube rises as it extends rearwardly such that it forms an acute angle of 10-30 degrees relative to a flat underlying surface (or an imaginary line running through the centers of the frame's dropouts. Accordingly, the adjustment of the frame's and bicycle's wheelbase also changes several other parameters including the head tube angle and the related trail measurement, such that shortening the wheelbase also acts to steepen the head tube and reduce trail.

Embodiments of the frame and bicycle typically include a seat that is pivotally attached to the frame at two or more locations, permitting the angle of the seat to be adjusted relative to the ground surface.

In other embodiments of the frame, the rear stay assembly can pivotally adjust and be fixedly secured at its front end where it connects with the rear end of main tube. Depending on the embodiment, the pivotable rear stay connection may be provided with the telescoping main tube or in conjunction with a fixed length main tube. By adjusting the position of the rear stay assembly on a frame that has an angled main tube, the wheelbase can be lengthened or shortened while also changing the head tube angle and the trail.

Advantageously, a cyclist that enjoys both riding fast (or racing), and more relaxed riding, such as touring or commuting can relatively quickly and easily adjust embodiments of the frame and bicycle for either circumstance negating the need to either have multiple bikes or settle on a compromise frame geometry that may not do either task as well as possible but can be used for both albeit at a reduced level of effectiveness. The adjustable frame also offers the advantage of permitting a user to make the frame and or bicycle as short as possible for transporting the bicycle to events whether the bike is packed in a box or shipping container for transport, or the bike is stowed in the trunk or back of an automotive vehicle.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

Unless otherwise indicated or dictated by context, the terms "approximately" and "about" mean +−20%. Unless otherwise indicated or dictated by context, the term "substantially" means +−10%. The term "generally" means for the most part.

The term "wheelbase" refers to the distance between the front and rear wheel axles of a bicycle. On a bicycle frame, the wheelbase comprises the distance between the center of the respective front and rear dropouts.

The "head tube angle" refers to the acute angle the axis of the head tube makes with a horizontal ground surface on which the bicycle rests in an upright position sporting front and rear wheels of a desired and/or designed for diameter. Generally, a steeper angle results in a bicycle with quicker steering characteristics compared to a shallower angle.

The "trail" of a bicycle follows from the head tube angle and comprises the distance between the point where a vertical line passing through the front axis of the front wheel intersects a flat ground surface, and the point where the head tube axis intersects the ground surface. Less trail generally results in a quicker steering bicycle compared to a longer trail.

The "main tube angle" as used herein refers to the angle formed between the effective center axis of the main tube and a line parallel with a horizontal ground surface on which the associated bicycle rests. On bicycles utilizing front and rear wheels of the same overall diameter, the main tube angle also comprises the angle formed between the center axis of the main tube and an imaginary line that passes through the centers of the front and rear dropouts.

An Embodiment of an Adjustable Wheelbase Front Wheel Drive Recumbent Bicycle

Figure 3:
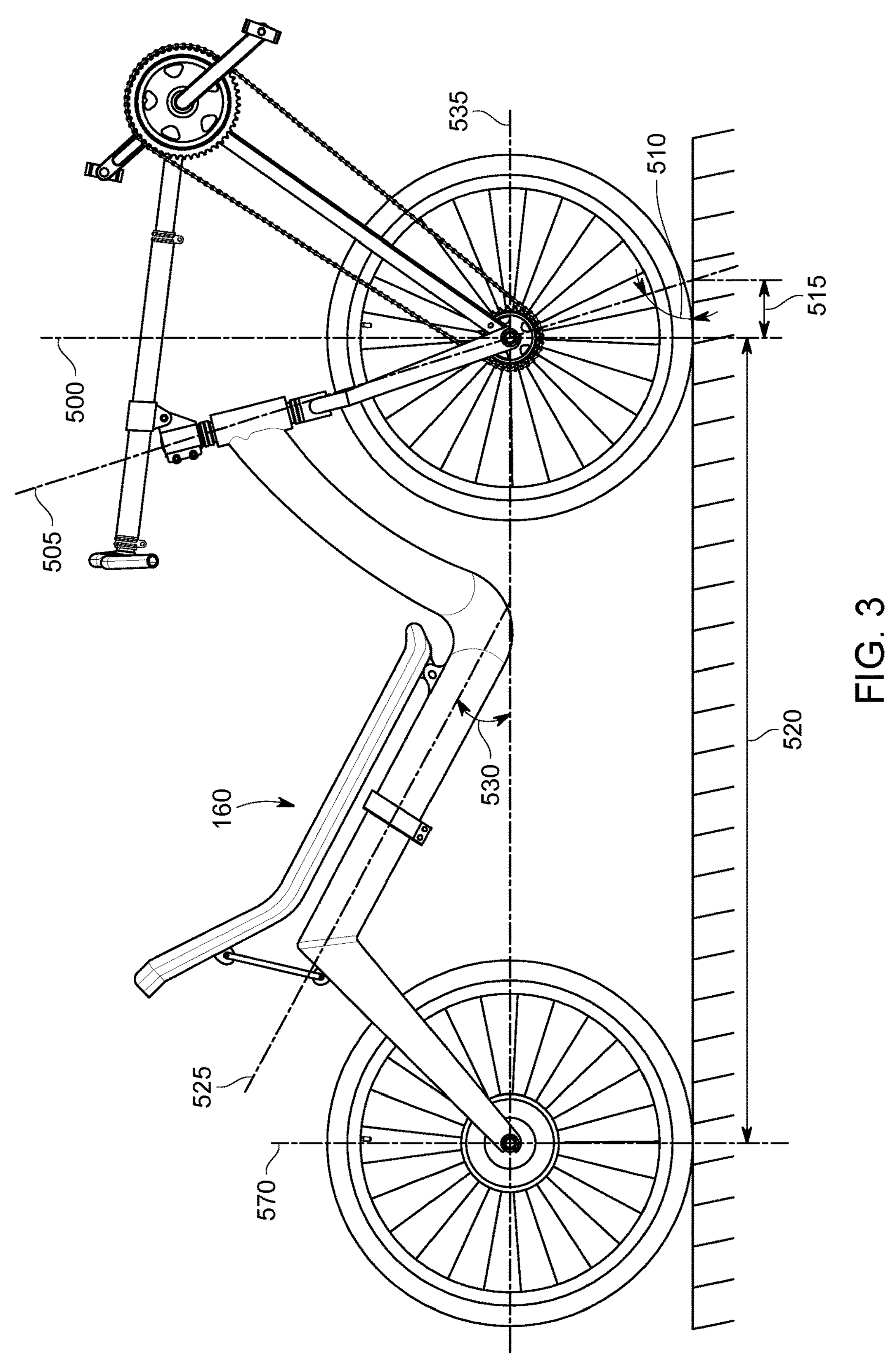
FIGS. 3 & 4 are partial two-dimensional views of a front wheel drive recumbent bicycle with the main tube extended and retracted according to an embodiment of the present invention.
Figure 4:
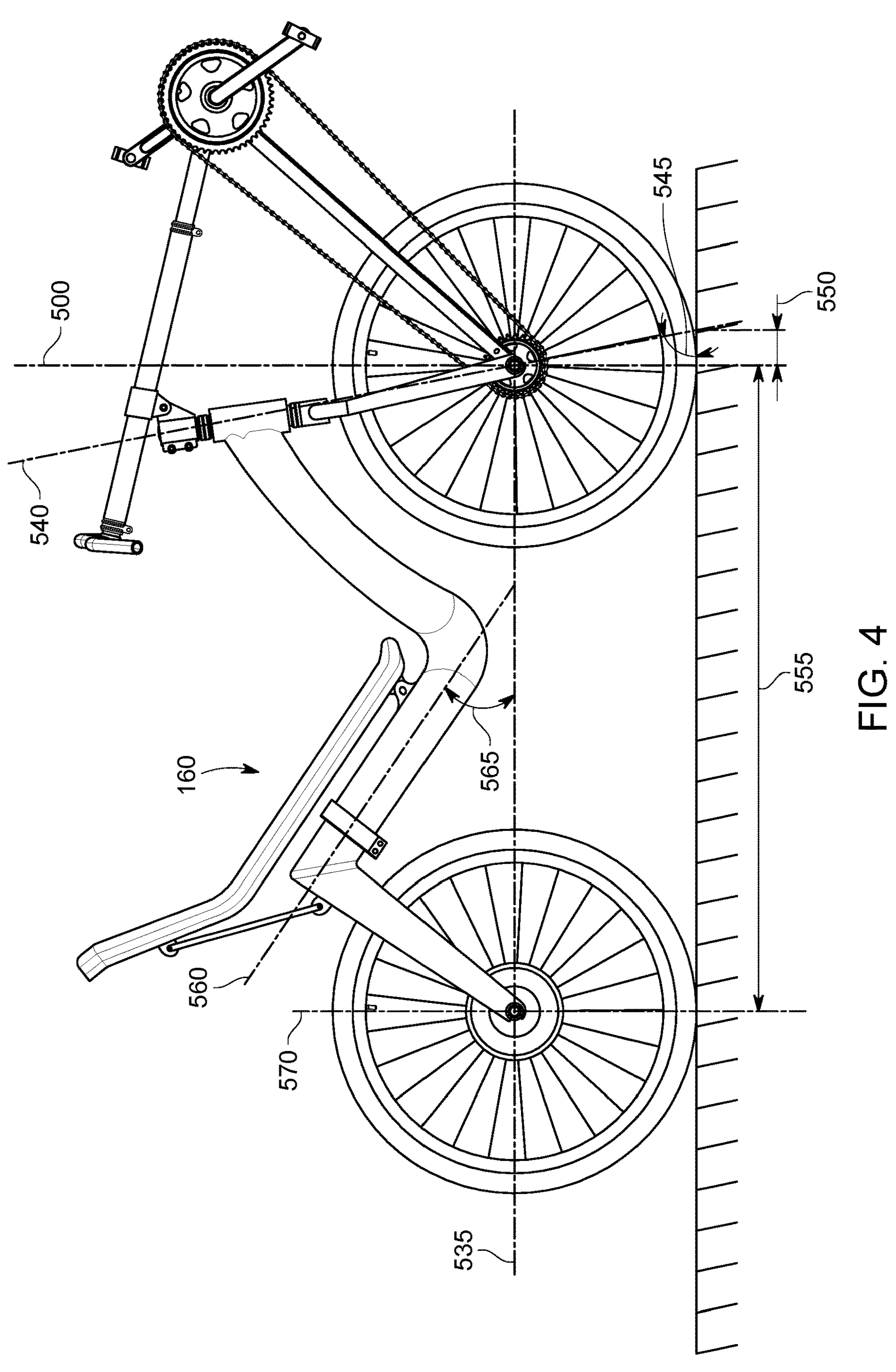

FIG. 1 is a side view of an embodiment of a front wheel drive bicycle 100 having an adjustable wheelbase see 520 & 555 of FIGS. 3 & 4 respectively). The bicycle is characterized by: a frame assembly 105 including a main frame 110 and a front triangle assembly 115; front and rear wheels 120&125; a seat 130; a drivetrain including a crankset 135, chain 225 and pedals 205; and a handlebar 140. The bicycle also typically includes brakes, brake levers, derailleurs, shift levers, and other standard components that are not illustrated in the FIG. 1. The Figures provided herein show a two-dimensional view of the bicycle and associated bicycle main frame, and as such, only one of the pair of chainstay tubes 160, and one of the pair of fork blades of the front fork 145, and one of the pair of rear stays 165 can be seen; however, one of ordinary skill appreciates that a generally symmetrical stay or fork blade is spaced behind the illustrated stay or blade between which the associated front and rear bicycle wheels are received.

A front triangle assembly 115 of a front wheel drive recumbent frame and bicycle is also described in detail in U.S. Pat. No. 7,753,388 entitled Front Wheel Drive Recumbent Bicycle, which is hereby incorporated by reference. The triangle includes a pivotal front fork 145 having left and right fork blades each terminating at front dropout 185 designed to receive the axle of the front wheel 120 therein. The fork blades are joined at a proximal end wherein a steerer tube (not shown) that extends generally upwardly passing through and substantially contained in a head tube 150 of the main frame 115 to which the steerer tube is pivotally attached. The top end of the steerer tube is coupled to a telescoping control tube 155 characterized by a handlebar mount at one end and a bottom bracket mount at its other forwardmost end. As can be appreciated, the handlebar 140 is mounted in a handle bar mount; and a bottom bracket is received in the bottom bracket mount, which rotatably attaches the bicycle's crankset 135 of the drivetrain to the front triangle. The telescoping nature of the control tube permits for adjustment of both the distance between the seat 130 and the crankset and the distance between the seat and the handlebar permitting a cyclist to fit the bicycle to his/her liking. These adjustments do not, however, provide for changing the operational or performance characteristics of the bicycle. The pair of chainstays 160 extend between the forwardmost end of the control tube and the distal ends of the fork blades to complete the front triangle assembly.

Operationally, the cyclist pushes the pedals 205 attached to the ends of the crankset's crankarms, which in turn causes the movement of the looped chain 225 to turn a gear of a gearset 230 attached to a hub of the front wheel 120 propelling the bicycle forward. The chain can be moved between the gears of the gearset using a derailleur (not shown) operated by a lever (also not shown) typically located on the handlebar 140. Steering the bicycle is accomplished by pivoting the front triangle relative to the main frame 110 and the rear wheel 125.

As can be appreciated, several variations of the front triangle assembly are known, and each of these variations can be used in embodiments of the present invention. Several of these variations are presented at www.cruzbike.com. For example, in one variation of the front triangle assembly, the control tube rearmost end mounts directly to a steerer tube, and the handlebar is mounted to the steerer tube and not the control tube. Ultimately, the front triangle assembly on embodiments of a front wheel drive bicycle is provided to facilitate steering of the bicycle and include a drivetrain for propelling the bicycle.

Figure 2:
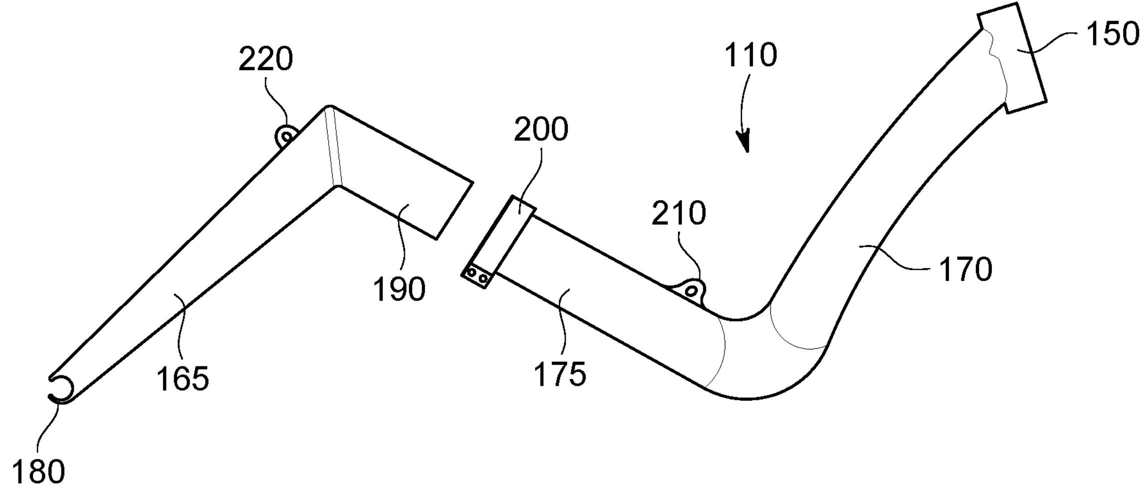
FIG. 2 is an exploded two-dimensional side view of a front wheel drive recumbent bicycle main frame according to one embodiment of the present invention.

The main frame 110 as best shown in FIGS. 1 & 2 comprises a telescoping main tube 160 with a pair of rear stays 165 extending rearwardly from the main tube's distal end that terminate in rear dropouts 180 for receiving the axle of the rear wheel 125. A front tube 170 extends generally upwardly from the front end of the main tube assembly 160 and terminates at the head tube 150 in which the steerer tube (substantially contained in the head tube) of the front triangle assembly 115 is rotatably attached.

The main tube assembly comprises front and back tubular portions 175&190 with the back tubular portion 190 being capable of sliding in out of the front portion 175 to set an overall length of the main tube. A clamping mechanism 200 is provided that is usually attached to the front portion to secure the back portion to it in a desired position. The nesting front and rear tubular portions can be of any cross-sectional shape, but are often not fully round so that the portions will not rotate along their axes relative to each other thereby helping maintain alignment of the rear dropouts 180 with the front dropouts 185.

Of important note, the main tube assembly extends rearwardly and upwardly from its junction with the front tube 170 to its junction with the rear chainstays 165. The main tube assembly forms an acute main tube angle 530 relative to a horizontal imaginary line 535 drawn through the center of dropouts 180 & 185 as illustrated in in FIG. 3. The main tube angle changes with the length of the main tube assembly and consequently the wheelbase of the frame is changed as is indicated by FIG. 4 wherein the main tube angle 565 is greater than the long wheel base main tube angle 530 of FIG. 3. As can be appreciated, changing the main tube assembly length also effects both the head tube angle 510 & 545 and the trail 515 & 550 as discussed in greater detail below.

The rear of the main tube's back portion 190 is attached to the pair of rear stays 165 between which a rear wheel 180 can be received and secured. In one embodiment the rear stays are fixedly attached to the main tube's back portion, but in other variations, such as presented in FIG. 5 and described below, the angle of the stays can be pivotally adjusted relative to the main tube assembly.

The recumbent seat/backrest 130 is adjustably attached to the main frame 110 by way of a pivotal mount 210 on the front tubular portion 175 and a pair of struts 215 with one end of each strut configured for pivotal connection to a mounting flange 220 on each rear stay 165 and an opposing end for pivotal connection to the back of the seat 130. Depending on variations, the struts can be of a fixed length or length-adjustable. Accordingly, as the length of the main tube 160 is lengthened or shortened, the relative positioning and orientation of the seat remains fixed relative to the drivetrain and the ground; or the seat/backrest can be adjusted by changing the length of the struts 215.

In use, the rear portion 190 is slid inwardly or outwardly relative to the front portion 175 of the main tube assembly 162. As can be appreciated when fully extended a suitable section of the rear portion, such as 4", must remain received in the front portion to ensure the frames overall structural integrity. Once the desire position is achieved, the two portions are fixedly secured to each other using the clamping mechanism 200.

The effect of lengthening or shortening the telescoping main tube assembly 160 is illustrated in FIGS. 3 & 4. The main tube is fully lengthened in FIG. 3 resulting in a long wheelbase 520, a greater (or more relaxed) head tube angle 510, and increased trail 515. Also importantly, the backrest/seat angle becomes more horizontal, placing the riding in a more supine position and reducing the rider's frontal surface area. This typically results in a more aerodynamic and stable configuration suitable for racing and high-speed descents.

In FIG. 4 the telescoping main tube 160 is fully retracted resulting in a short wheelbase 555, a steep head tube angle 545, and a short trail 550. This configuration provides for a more upright rider, quicker steering and enhanced handling capabilities, such as may be desired when riding in traffic or touring at a relaxed pace. Furthermore, the shortened wheelbase makes for a more compact configuration, which can be desirable when fitting the bike in a vehicle or boxing it for shipment.

Figure 5:
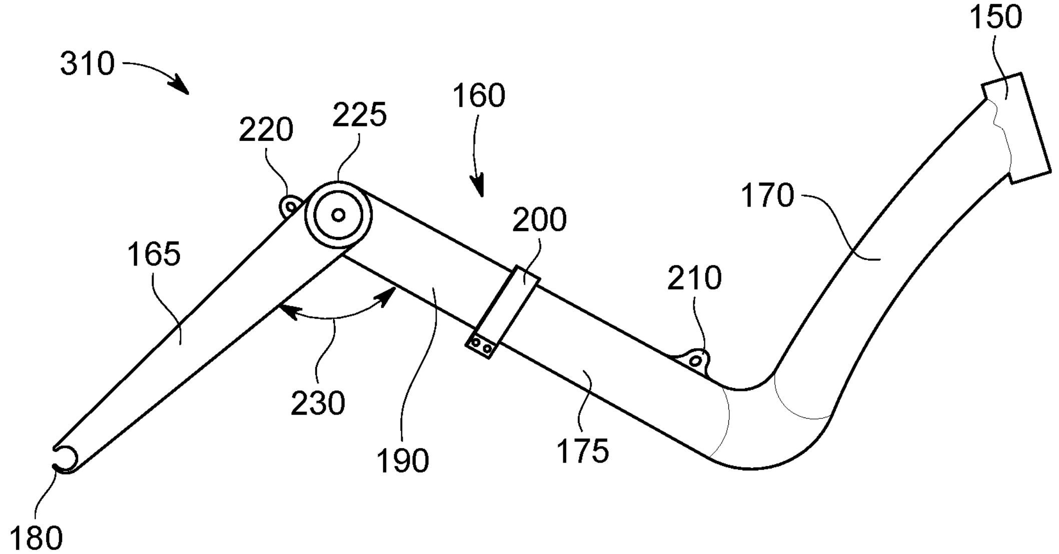
FIG. 5 is an exploded two-dimensional side view of a front wheel drive recumbent bicycle main frame according to one embodiment of the present invention.

FIG. 5 is an illustration of a recumbent main frame 310 substantially similar to the main frame 110 described with reference to FIGS. 1 & 2 except instead of the rear stays 165 being fixedly secured to the rear portion 190 of the main tube 162, they are pivotally adjustable by way of a locking pivot clamp 225. By loosening the locking pivot clamp and pivoting the stays relative to the main tube, the wheelbase, head tube angle and trail can also be changed. The version illustrated in FIG. 5 incorporates both the pivoting rear stays and the telescoping main tube assembly for maximum adjustability; however, some variations of the frame include a fixed main tube and only the pivotally adjustable stays.

Methods of Using Embodiments of Adjustable Front Wheel Drive Recumbent Bicycle

To either lengthen or shorten the wheelbase 520 & 555 of the frame 105 or bicycle 100, the user first loosens the main tube clamp 200 to permit the front and rear tube portions 175&190 to slide freely relative to one another. In some variations, the user may also loosen one or more of the bolts securing the seat 130 and/or the rear struts 215 to the frame so that the seat may freely pivot as the length of the frame is adjusted. The rear tube portion is then slid inwardly or outwardly until the desired wheelbase is achieved, and finally the clamp and seat mounting bolts are tightened.

To prepare a bicycle for transport whether to place the bike in the back of a vehicle or package it in a box or container, the foregoing procedure is followed except the main tube assembly 162 is shortened as much as possible. Depending on the space in which the bicycle is to be received, the user may also remove one or both of the front and rear wheels and the seat.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A bicycle frame assembly for a front wheel drive front steering recumbent bicycle, the bicycle frame comprising:

a front triangle assembly including a pair of front fork blades terminating in front dropouts, and a control tube having a bottom bracket mount at a forwardmost control tube end; and a main frame having (i) a head tube pivotally coupled to the front triangle assembly, (ii) a pair of rear stays terminating at rear dropouts at a rear stay back end, (iii) a front tube having a front tube front end and a front tube back end, the front tube front end being attached to the head tube and (iv) a telescoping main tube assembly with a main tube front end fixedly attached to the front tube back end and a main tube back end attached to the rear stays, the main tube assembly extending rearwardly and upwardly at a main tube angle relative to an imaginary line passing through centers of the front and rear dropouts, and the main tube assembly being fixedly adjustable between a fully retracted length and a fully extended length.

2. The bicycle frame of claim 1, wherein the main tube angle is about 10-30 degrees.

3. The bicycle frame of claim 1, wherein the main tube assembly comprises a front tubular portion, a rear tubular portion, and a clamping mechanism with the rear tubular portion being slidably received in the front tubular portion, and the clamping mechanism being configured to fix the rear tubular portion relative to the front tubular portion when secured.

4. The bicycle frame of claim 1, wherein each of overlapping portions of the front and rear tubular portions have a non-circular cross section.

5. The bicycle frame of claim 1, wherein the frame is comprised of one or more of steel, aluminum alloy, titanium alloy, magnesium alloy, and composite material.

6. The bicycle frame of claim 1 further including at least one front seat mount on the main tube assembly, and a first rear seat mount on a first rear stay of the pair of rear stays and a second rear seat mount on a second rear stay of the pair of rear stays.

7. A front wheel drive recumbent bicycle comprising in combination the bicycle frame of claim 1, a rear wheel rotatably secured to the rear dropouts, a seat secured to the main frame, a handlebar secured to the control tube, a crankset assembly secured to the bottom bracket mount, and a front wheel rotatably secured to the front dropouts.

8. A method of simultaneously increasing or decreasing the wheelbase and trail while respectively simultaneously reducing or increasing the head tube angle of the front wheel drive recumbent bicycle of claim 7, the method comprising: adjusting a length of the main tube assembly.

9. The bicycle frame of claim 1, wherein the pair of rear stays is fixedly pivotal relative to the main tube assembly.

10. A method of preparing the front wheel drive recumbent bicycle of claim 7 to be transported, the method comprising:

loosening a main tube clamping mechanism; and adjusting the main tube assembly to the fully retracted length.

11. A front wheel drive and front steerable recumbent bicycle comprising:

a frame assembly including, (i) a front triangle assembly including a pair of front fork blades terminating in front dropouts, and a control tube having a bottom bracket mount at a forwardmost control tube end; and (ii) a main frame having a head tube pivotally coupled to the front triangle assembly, a pair of rear stays terminating at rear dropouts at a rear stay back end, a front tube having a front tube front end and a front tube back end, the front tube front end being attached to the head tube; a main tube assembly having a fixedly adjustable length with a main tube front end fixedly attached to the front tube back end and a main tube back end attached to the rear stays, the main tube assembly extending rearwardly and upwardly at a main tube angle relative to an imaginary line passing through centers of the front and rear dropouts;

a front wheel secured to the front dropouts;

a rear wheel secured to the rear dropouts;

a handlebar attached to the control tube;

a drivetrain with a crankset mounted to the bottom bracket mount, a gearset coupled to the front wheel and a chain extending between the gearset and the crankset; and a seat coupled to the main frame;

wherein the wheelbase, head tube angle and trail are changed simultaneously by changing the fixedly adjustable length.

12. The recumbent bicycle of claim 11, wherein as the main tube assembly extends rearwardly, the main tube extends upwardly at an acute main tube angle relative to a horizontal imaginary line passing through centers of front and rear dropouts.

13. The recumbent bicycle of claim 12, wherein the acute angle is about 10-30 degrees.

14. The recumbent bicycle of claim 11, wherein the rear stays are fixedly pivotal relative to a main tube assembly.

15. The recumbent bicycle of claim 11, wherein the main tube assembly comprises a front portion, a rear portion and a clamping mechanism, and wherein the length of the main tube assembly is adjustable by selectively fixing the position of the front and rear portions relative to each other using the clamping mechanism.

16. The recumbent bicycle of claim 15, wherein at least one of one of the front and rear portions are tubular, and the other of the front and rear portions is slidably received in the one of the front and rear portions.

17. The recumbent bicycle of claim 16, wherein the rear portion is received in the front portion.

* * * * *